United States Patent [19]

Kanaguchi et al.

[11] Patent Number: 4,887,775
[45] Date of Patent: Dec. 19, 1989

[54] REEL TABLE ASSEMBLY

[75] Inventors: Masahiro Kanaguchi; Hideo Kawamoto, both of Tokyo, Japan

[73] Assignee: Sony Corporation, Tokyo, Japan

[21] Appl. No.: 168,553

[22] Filed: Mar. 4, 1988

Related U.S. Application Data

[63] Continuation of Ser. No. 866,409, May 23, 1986, abandoned.

[30] Foreign Application Priority Data

May 23, 1985 [JP] Japan .................. 111182/85

[51] Int. Cl.[4] .................. B65H 16/10; B65H 18/10
[52] U.S. Cl. .................. 242/68.1; 242/199
[58] Field of Search .......... 242/199, 200, 201, 202, 242/203, 68.1, 68.2, 68.3

[56] References Cited

U.S. PATENT DOCUMENTS

| | | | |
|---|---|---|---|
| 2,221,089 | 11/1940 | Githens et al. | 242/68.3 |
| 3,212,726 | 10/1965 | Whiteley | 242/68.3 |
| 3,224,701 | 12/1965 | Wynne | 242/68.1 |
| 3,236,468 | 2/1966 | Foret | 242/68.3 X |
| 3,731,885 | 5/1973 | Siebert | 242/68.3 |
| 3,873,193 | 3/1975 | Iida et al. | 242/199 X |
| 3,934,839 | 1/1976 | Serizawa | 242/198 |
| 4,492,998 | 1/1985 | Kamimura et al. | 242/68.3 X |
| 4,595,962 | 6/1986 | d'Alayer de Costemore d'Arc | 242/199 X |
| 4,609,164 | 9/1986 | Komatsubara et al. | 242/68.3 X |

FOREIGN PATENT DOCUMENTS

| | | |
|---|---|---|
| 2064362 | 7/1972 | Fed. Rep. of Germany . |
| 2434847 | 7/1975 | Fed. Rep. of Germany . |
| 3151103 | 8/1982 | Fed. Rep. of Germany . |
| 3233191 | 3/1983 | Fed. Rep. of Germany . |
| 627534 | 8/1978 | U.S.S.R. .................. 242/68.1 |

Primary Examiner—Joseph J. Hail, III
Attorney, Agent, or Firm—Hill, Van Santen, Steadman & Simpson

[57] ABSTRACT

A reel table assembly for driving a tape reel which has a center hole and a plurality of equally spaced inwardly extending radial teeth formed circumferentially thereof comprises a reel table formed centrally with a reel shaft for carrying thereon the tape reel with the center hole, and a plurality of equally spaced drive pawls which are provided circumferentially in the reel shaft and project radially outwardly of the reel shaft under a resilient force for mesh engagement with the radial teeth of the tape reel. The drive pawls are movable radially inwardly of the reel shaft when the tape reel is carried on the reel table with the radial teeth being in radial abutment on the drive pawls. A friction member is provided on the reel table for direct contact with the tape reel to provide a high degree of friction between the reel table and the tape reel carried on the reel table. The reel table also comprises a low-friction means provided on the reel table for direct contact with the tape reel to maintain the tape reel lifted off the friction member only when the tape reel is carried on the reel table with the radial teeth being in radial abutment with the drive pawls.

8 Claims, 3 Drawing Sheets

REEL TABLE ASSEMBLY

This is a continuation of application Ser. No. 866,409, filed May 23, 1986, now abandoned.

BACKGROUND OF THE INVENTION

This invention relates to a reel table assembly for driving a tape reel.

A tape cassette employed for use with a video tape recorder or the like generally comprises a pair of tape reels contained therein and a magnetic tape wound around the pair of tape reels from the both ends. Each tape reel has a center hole and a plurality of equally spaced and inwardly extending radial teeth formed circumferentially of the center hole.

In order to drive the tape reels, the video tape recorder has a pair of reel table assemblies. Each reel table assembly includes a disc-shaped reel table with a reel shaft formed centrally on the upper surface thereof in a body. The reel table assembly is secured on a drive shaft which is connected to a reel motor for rotating the reel table assembly.

The reel table has a friction member thereon for providing a high degree of friction with the bottom of the tape reel by directly contacting therewith so as to permit rotation of the tape reel with rotation of the reel table.

The reel table assembly has a plurality of equally spaced and radially extending drive pawls wich is mounted on the circumferential surface of the reel shaft. In order to prevent the radial teeth of the tape reel from putting on the drive pawls when the phase of each other is coincident, the drive pawls are so designed to project outwardly of the reel shaft under a resilient force for mesh engagement with the radial teeth of the tape reel, and to be movable radially inwardly of the reel shaft when the radial teeth are in radial abutment with the drive pawls.

A torque is transmitted from the reel table assembly to the tape reel through the mesh engagement between the drive pawls and the radial teeth and also through the friction between the friction member and the bottom of the tape reel. This permits certain transmission of a greatly changing torque produced on a reel motor required for high-accuracy servo control of the tension on the magnetic tape.

However, when the tape cassette is inserted in the cassette holder of the video tape recorder and the center hole of the tape reel receives the reel shaft, the drive pawls are often pushed radially inwardly of the reel shaft, as the radial teeth of the tape reel are in radial abutment on the drive pawls.

The friction between the friction member and the tape reel is too great to allow smooth sliding movement of the tape reel with respect to the reel table with the result that the drive pawls will remain in radial abutment with the radial teeth. This is true particularly when the tape reel has a large diameter and carries a great number of turns of magnetic tape thereon. Under this condition, the torque transmission is made from the reel table to the tape reel only through the friction between the friction member and the tape reel, resulting in an excessive transient tension on the running tape. If the torque transmitted to the tape reel exceeds a level that can be transmitted through the friction between the friction member and the tape reel, slip will occur between the reel table and the tape reel to decrease the accuracy of the tape tension servo control.

OBJECTS AND SUMMARY OF THE INVENTION

Therefore, it is an object of the present invention to provide improved reel table assembly.

It is another object of the present invention to provide reel table assembly which has simple construction.

It is further object of the present invention to provide reel table assembly which can be easily assembled.

It is still further object of the present invention to provide reel table assembly which permits smooth sliding movement of the tape reel with respect to the reel table so as to place the drive pawls into mesh engagement with the radial teeth of the tape reel with rotation of the reel table when the tape reel is placed on the reel table even with the radial teeth being in radial abutment with the drive pawl.

Therefore, in accordance with the present invention, a reel table assembly for driving a tape reel having a center hole formed therein and a plurality of inwardly extending radial teeth formed circumferentially of the center hole, the reel table assembly comprises a body formed centrally with a reel shaft for carrying thereon the tape reel with the center hole, a friction member provided on the reel table for direct contact with the tape reel to provide a high degree of friction with the tape reel carried on the reel table, and a drive pawl provided circumferentially in the reel shaft. The drive pawl projects radially outwardly of the reel shaft under a resilient force for mesh engagement with the radial teeth, and is movable radially and inwardly of the reel shaft. The reel table assembly also includes a low-friction member provided on the reel table for direct contact with the tape reel to maintain the tape reel lifted thereoff only when the tape reel is carried on the reel table with the radial teeth in radial abutment with the drive pawl.

BRIEF DESCRIPTION OF THE DRAWINGS

The present invention will be described in greater detail by reference to the following description taken in connection with the accompanying drawings, in which.

DETAILED DESCRIPTION OF THE PREFERRED EMBODIMENT

Figure 1:
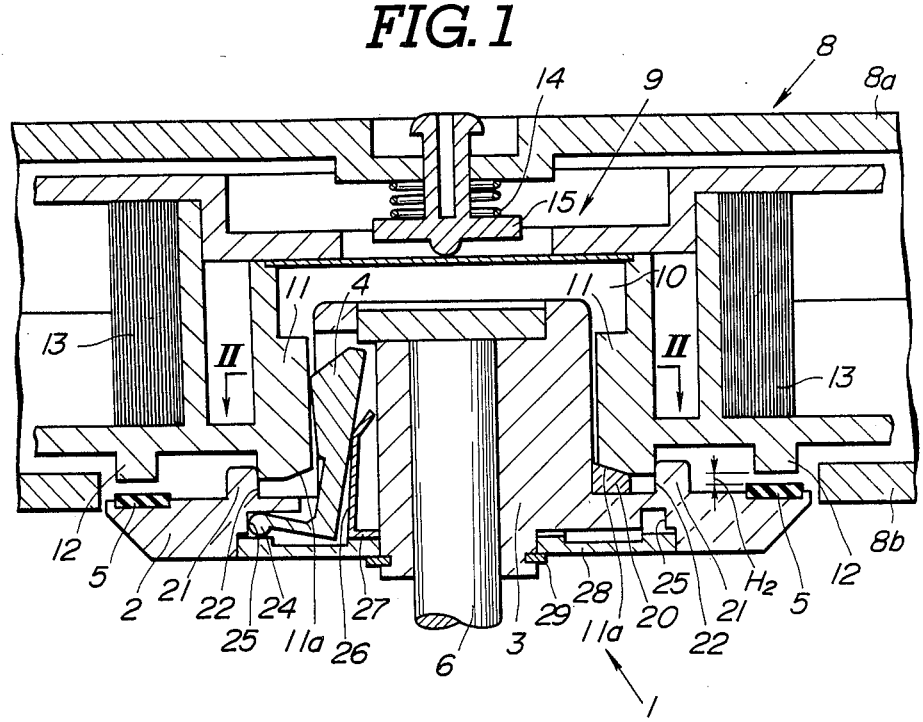
FIG. 1 is a longitudinal sectional view showing the reel table assembly according to an embodiment of the invention with the drive pawls shown in radial abutment with the radial teeth of the tape reel.

With reference to the drawings, there is illustrated one embodiment of a reel table assembly made in accordance with the present invention. Referring to FIGS. 1 to 4, the reel table assembly 1 comprises a disc-shaped reel table 2 with a reel shaft 3 formed perpendicular thereto and centrally on the upper surface thereof in a body, a plurality, in the illustrated case three, of equally spaced radially extending drive pawls 4 mounted on the circumferential surface of the reel shaft 3 for radial movement with respect to the reel shaft 3, and an annular friction member 5 made of a high-friction material such for example as rubber and stuck on the upper surface near the outer periphery of the reel table 2. The reel table assembly 1 is secured on a drive shaft 6 which is connected to a reel motor (not shown) for rotating the reel table assembly 1.

Figure 3:
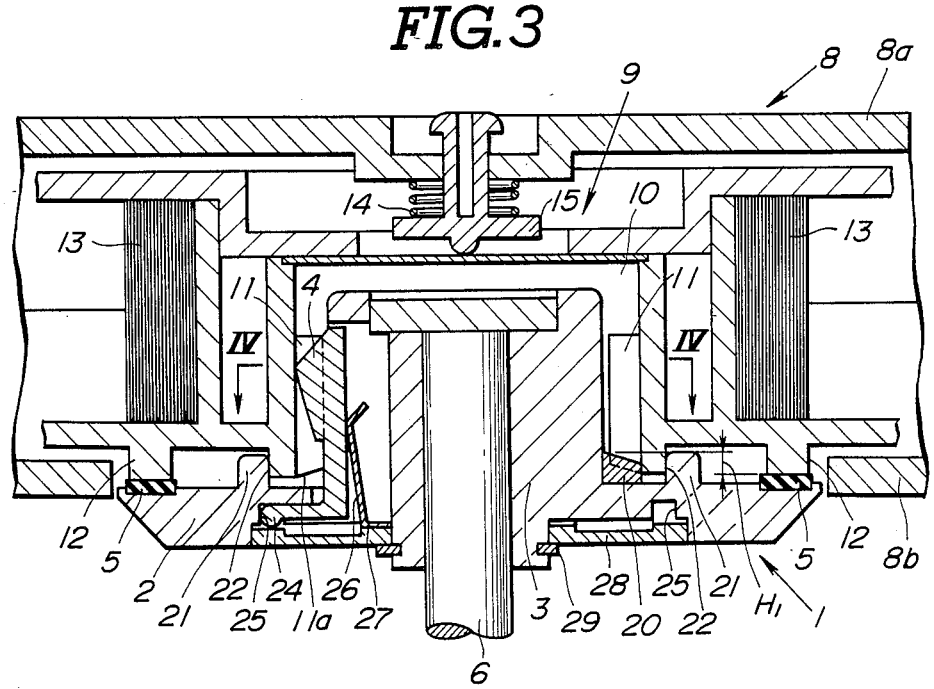
FIG. 3 is a longitudinal sectional view showing the reel table assembly shown in FIGS. 1 and 2 with the drive pawls shown in mesh engagement with the radial teeth of the tape reel.
Figure 5:
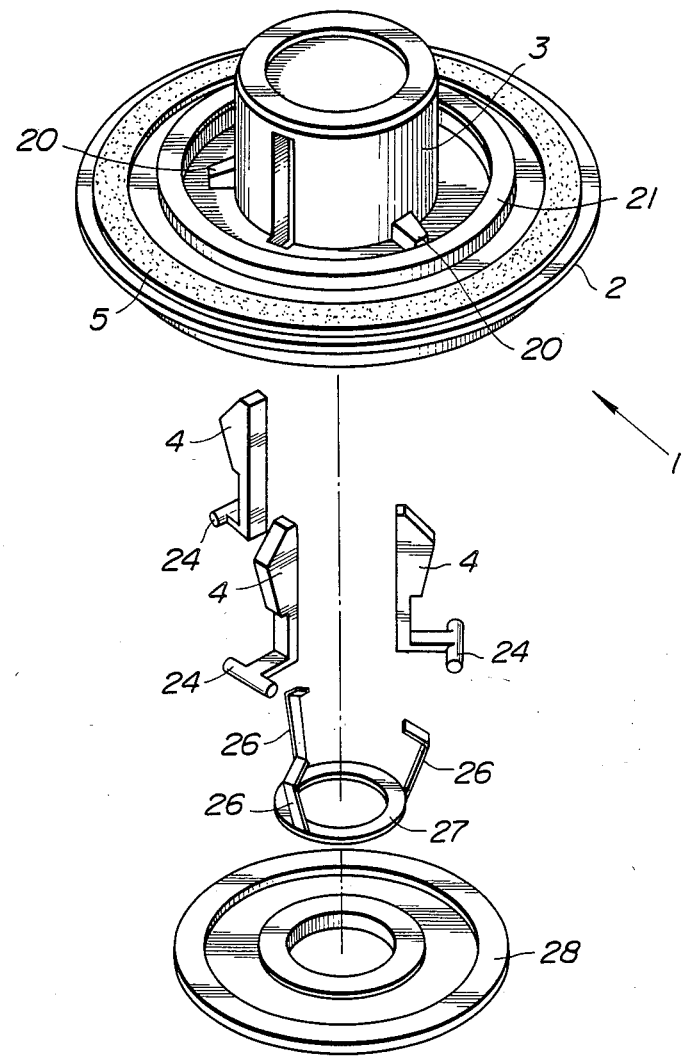
FIG. 5 is an exploded perspective view of the reel table assembly shown in FIGS. 1 to 4.

In more detail, the reel shaft 3 is formed in its circumferential surface with circumferentially spaced recesses which receive the respective drive pawls 4. As shown in FIG. 5, the drive pawls 4 are substantially of an L-shape having a fulcrum roll portion 24 at one end and a lobe portion at the other end thereof. As shown in FIGS. 1 and 3, the drive pawls 4 are assembled in the reel table assembly 1 with the fulcrum roll portions 24 being placed in an annular groove 25 formed in the lower surface of the reel table 2 so that the drive pawls 4 can rotate about their fulcrum roll portions 24 to permit radial inward and outward movement of the drive pawl lobe portions with respect to the reel shaft 3. Three leaf springs 26 are connected at their lower ends to an annular member 27 to provide an integral spring which is assembled in the reel table 2 with the leaf springs 26 being placed in the respective recesses formed in the reel shaft 3. The leaf springs 26 urge the corresponding drive pawls 4 to rotate about their fulcrum roll portions 24 so as to project normally radially outwardly. A bottom lid 28 is mounted on the reel table 2 by means of an C-ring 29. This structure permits easy assemble of the drive pawls in the reel table assembly 1.

Figure 4:
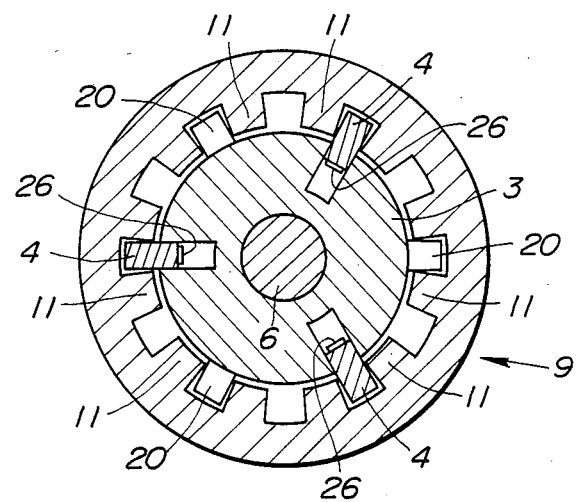
FIG. 4 is a sectional view taken on line IV—IV in FIG. 3.

A tape cassette 8 is comprised of upper and lower halves 8a and 8b secured to each other, a tape reel 9 contained therein and a magnetic tape 13 wound around the tape reel 9. The tape reel 9 is formed its center hole 10 to be engaged with the reel shaft 3 and has a plurality, in the illustrated case twelve, of equally spaced and inwardly extending radial teeth 11 formed circumferentially of the center hole. The number of the radial teeth 11 is integral multiples of that of the drive pawls 4 provided on the reel shaft 3. A compression spring 14 is placed between a pusher 15 and the tape cassette upper half 8a for urging the pusher 15 to push the tape reel 9 against the tape cassette lower half 8b. The tape reel 9 is formed on its lower surface with an annular protrusion 12. The annular protrusion 12 comes into pressure contact with the annular friction member 5 to provide a high degree of friction between them under the resilient force of the compression spring 14, as shown in FIG. 3, when the tape reel 9 is placed in position on the reel table assembly 1 with the drive pawls 4 in mesh engagement with the radial teeth 11, as shown in FIGS. 3 and 4. In this position, the abutment of the annular protrusion 12 on the friction member 5 lifts the tape reel 9 off the tape cassette lower half 8b so that it can rotate with rotation of the reel table assembly 1.

The friction between the annular friction member 5 and the annular protrusion 12 is effective to ensure transmission of a great torque change produced on the reel motor from the reel table assembly 1 to the tape reel 9. This is required to provide high-accuracy servo control of the tension on the running tape 13. However, the capacity of the annular friction member 5 transmitting the torque from the reel table assembly 1 to the tape reel 9 is limited to an extent. In order to compensate for the insufficient capacity, the drive pawls 4 are provided for mesh engagement with the radial teeth 11 to transmit the torque from the reel table assembly 1 to the tape reel 9.

An annular protrusion 21 is formed on the reel table 2 at a position for engagement of its inner surface with the stepped portion formed on the lower surface of the tape reel 9 to ensure good center alignment of the tape reel 9 with respect to the reel table assembly 1.

The reel table assembly 1 also has, for example, three equally spaced projections 20 secured, such as by adhesive, on the circumferential surface of the reel shaft 3. The projections 20 are made of polyoxymethylene (POM) or other low-friction synthetic resins having a high resistance to wear. Each projection 20 is positioned circumferential midway between each pair of adjacent two drive pawls 4, specially to face to one of the teeth 11 of the tape reel 9 when the drive pawls 4 are in radial abutment with the radial teeth 11 of the tape reel 9. In addition, as best shown in FIGS. 3 and 4, the projections 20 have a height a distance $H_1$ higher than the height of the annular friction member 5 and a width substantially equal to that of the drive pawls 4.

When the tape reel 9 is placed and carried on the reel table assembly 1 with the three drive pawls 4 being in mesh engagement with the radial teeth 11, the three projections 20 can be also placed in mesh engagement with the radial teeth 11, as shown in FIGS. 3 and 4. Accordingly, the tape reel 9 can move downward until the annular protrusion 12 comes in abutment on the annular friction member 5. Under this condition, the rotational movement of the reel table assembly 1 is transmitted through the mesh engagement between the drive pawls 4 and the radial teeth 11 and also through the friction between the annular friction member 5 and the annular protrusion 12. This ensures certain transmission of a greatly changing torque from the reel motor to the tape reel 9 to permit high-accuracy servo control of the tension on the running tape 13.

Figure 2:
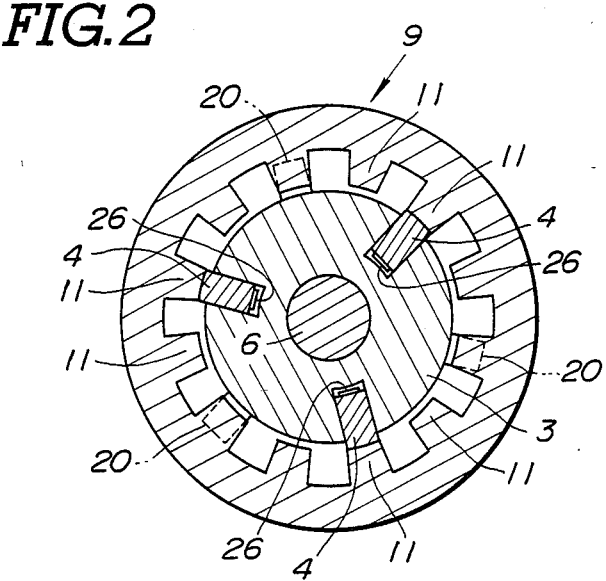
FIG. 2 is a sectional view taken on line II—II in FIG. 1.

When the tape reel 9 is placed and carried on the reel table assembly 1 the radial teeth 11 may interfere with and push the drive pawls 4 radially and inwardly into the respective recesses formed in the circumferential surface of the reel shaft 3 against the resilient force of the leaf springs 26, and remain in radial abutment with the drive pawls 4, as shown in FIGS. 1 and 2. However, the lower end surfaces 11a of three of the radial teeth 11 come into abutment on the three respective projections 20 so as to restrict the downward movement of the tape reel 9 at a position where the annular protrusion 12 is a distance $H_2$ higher than the annular friction member 5, so that the annular protrusion 3 is lifted off the annular friction member 5. Since no friction occurs between the annular protrusion 12 and the annular friction member 5 under this condition, the radial teeth 11 can slide on the respective projections 20 to place the drive pawls 4 into engagement with the radial teeth 11 with rotation of the reel table assembly 1. Substantially at the same time when the drive pawls 4 come into mesh engagement with the radial teeth 11, the annular protrusion 12 comes into pressure contact with the annular friction member 5, under the resilient force of the compression spring 14. In order to minimize the slack on the magnetic tape 13, it is preferable to rotate the reel table in the direction of winding the magnetic tape 13 around the tape reel 9. Thereafter, the rotational movement of the reel table assembly 1 is transmitted through the mesh engagement between the drive pawls 4 and the radial teeth 11 and also through the friction between the annular friction member 5 and the annular protrusion 12, thereby ensuring certain transmission of a greatly changing torque from the reel motor to the tape reel 9 to permit high-accuracy servo control of the tesnion on the running tape 13.

It is apparent from the foregoing that a highly important advantage of the invention is in the provision of low-friction projections 20 on the reel table capable of restricting downward movement of the tape reel at a position where the tape reel is lifted off the friction member 5 when the tape reel is placed on the reel table with the radial teeth being in radial abutment with the drive pawls. This permits smooth sliding movement of the tape reel on the projections so as to place the drive pawls 4 into mesh engagement with the radial teeth 11 with rotation of the reel table assembly 1. It is, therefore, possible to preclude the possibility of the drive pawls from remaining in radial abutment on the radial teeth and ensure transmission of a greatly changing torque from the reel table to the tape reel, thereby permitting high-accuracy servo control of the tension on the running tape 13.

It will be appreciated that the invention is equally applicable and is in fact intended for use with various types of apparatus using tape reels rotated for recording and/or reproducing data.

While this invention has been described in conjunction with a specific embodiment, therefore, it is evidence that may alternatives, modifications and variations will be apparent to those skilled in the art. For example, the number of low-friction projections 20 which can used in the practice of the invention is not limited in any way to three and may be at least one as long as the tape reel comes into direct contact with the low-friction projection(s) to maintain the tape reel lifted off the friction member when the tape reel is carried on the reel table with the radial teeth being in radial abutment with the drive pawls. Accordingly, it is intended to embrace all alternatives, modifications and variations that fall within the scope of the appended claims.

What is claimed is:

1. A reel table assembly for driving a tape reel having a center hole therein and a plurality of inwardly extending radial teeth formed circumferentially of the center hole, the reel table assembly comprising:
    a reel table driven by a reel motor and having a reel shaft formed centrally thereof for engaging with the center hole of the tape reel when the tape reel is carried thereon;
    a drive pawl provided circumferentially on said reel shaft, biasing means urging said pawl to normally project radially outwardly from said reel shaft for mesh engagement with the radial teeth of the tape reel to positively drive the tape reel, said pawl being movable radially inwardly toward the center of said reel shaft into a position in radial abutment with the radial teeth of the tape reel;
    a friction member provided on an upper side of said reel table for direct contact with a lower side of the tape reel to provide a high degree of friction with the tape reel; and
    projection means fixedly connected for rotation with said reel table and having a low-friction upper surface which contacts with a lower surface of the radial teeth of the tape reel only when said drive pawl is in radial abutment with the radial teeth and has a height maintaining the tape reel lifted apart from said friction member when a radial tooth of the tape reel contacts said projection means, said projection means having a width narrower than the space between adjacent teeth of the reel center hole so as to be located between the radial teeth when said drive pawl is located between the radial teeth of the tape reel thereby allowing the reel to contact said friction member, said projection means comprising at least one projection at a position separate from said drive pawl, whereby said tape reel is engaged with said drive pawl only when said projection is in alignment with a space between adjacent teeth, said drive movable independently of said projection means.

2. The reel table as claimed in claim 1, wherein said projection means comprises a plurality of equally spaced projections fixed circumferentially on said reel shaft.

3. The reel table as claimed in claim 1 whrein said projection means comprises a plurality of equally spaced projections fixed circumferentially on said reel table.

4. The reel table as claimed in claim 1, wherein said drive pawl comprises a plurality of equally spaced drive pawls.

5. A reel table assembly for driving a tape reel having a center hole therein and a plurality of inwardly extending radial teeth formed circumferentially of the center hole, the reel table assembly comprising:
    a reel table driven by a reel motor and having a reel shaft formed centrally thereof for engaging with the center hole of the tape reel when the tape reel is carried thereon;
    a drive pawl provided circumferentially on said reel shaft, biasing means for biasing said pawl to normally project radially outwardly from said reel shaft for mesh engagement with the radial teeth of the tape reel to positively drive the tape reel, said pawl being movable radially inwardly toward the center of said reel shaft into a position in radial abutment with the radial teeth of the tape reel;
    a friction member provided on an upper side of said real table for direct contact with a lower side of the tape reel to provide a high degree of friction with the tape reel; and
    projection means fixedly connected to said reel table having a low-friction upper surface which contacts with a lower surface of the radial teeth of the tape reel only when said drive pawl is in radial abutment with the radial teeth and has a height maintaining the tape reel lifted apart from said friction member when a radial tooth of the tape reel contacts said projection means, said projection means having a width narrower than the space between adjacent teeth of the reel center hole so as to be located between the radial teeth when said drive pawl is located between the radial teeth of the tape reel thereby allowing the reel to contact said friction member, said projection means comprising at least one projection at a position separate from said drive pawl means, whereby said tape reel is engaged with said drive pawl only when said projection is in alignment with the space between adjacent teeth, said pawl movable independently of said projection means.

6. A reel table as claimed in claim 5, wherein said projection is located at a positive spaced circumferentially from said drive pawl.

7. A reel table as claimed in claim 5, wherein said friction member is annular and engages an annular surface of said tape reel for transmitting torque to said tape reel.

8. A reel table as claimed in claim 5, wherein said low friction upper surface comprises a surface area which engages a corresponding surface area of the lower surface of said teeth.

* * * * *